(12) United States Patent
Kakegawa et al.

(10) Patent No.: US 9,041,778 B2
(45) Date of Patent: May 26, 2015

(54) IMAGE PROCESSING DEVICE AND METHOD OF PROCESSING IMAGE

(71) Applicant: Hitachi Automotive Systems, Ltd., Hitachinaka-shi, Ibaraki (JP)

(72) Inventors: Shinji Kakegawa, Tokyo (JP); Hiroto Mitoma, Hitachinaka (JP); Akira Oshima, Tokyo (JP); Haruki Matono, Tokyo (JP); Takeshi Shima, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/357,070

(22) PCT Filed: Oct. 24, 2012

(86) PCT No.: PCT/JP2012/077385
§ 371 (c)(1),
(2) Date: May 8, 2014

(87) PCT Pub. No.: WO2013/069453
PCT Pub. Date: May 16, 2013

(65) Prior Publication Data
US 2014/0320612 A1  Oct. 30, 2014

(30) Foreign Application Priority Data
Nov. 11, 2011 (JP) ................. 2011-247749

(51) Int. Cl.
*G01C 3/14* (2006.01)
*H04N 13/02* (2006.01)
*G08G 1/16* (2006.01)
*G06T 7/00* (2006.01)
*H04N 13/00* (2006.01)

(52) U.S. Cl.
CPC ........... *H04N 13/0246* (2013.01); *G08G 1/166* (2013.01); *G01C 3/14* (2013.01); *G06T 7/0075* (2013.01); *G06T 2207/10012* (2013.01); *G06T 2207/30261* (2013.01); *H04N 13/0239* (2013.01); *H04N 2013/0085* (2013.01)

(58) Field of Classification Search
CPC ......................................... G01C 3/14
USPC ........................................... 348/47
See application file for complete search history.

(56) References Cited

U.S. PATENT DOCUMENTS

2009/0284627 A1   11/2009 Bando et al.

FOREIGN PATENT DOCUMENTS

| JP | 2003-58885 A | 2/2003 |
| JP | 2008-114627 A | 5/2008 |
| JP | 2009-111921 A | 5/2009 |
| JP | 2009-276294 A | 11/2009 |

OTHER PUBLICATIONS

International Search Report (PCT/ISA/210) with English translation dated Jan. 22, 2013 (Four (4) pages).

*Primary Examiner* — Dave Czekaj
*Assistant Examiner* — Berteau Joisil
(74) *Attorney, Agent, or Firm* — Crowell & Moring LLP

(57) ABSTRACT

To obtain an image processing device and a method of processing an image that improve distance accuracy and is capable of performing accurate distance even about an object at a greater distance than before, when a distance to an object is measured, one image object region 302 including an image of an object is extracted from one image of a pair of images imaged by a pair of imaging elements at the same time in the same direction. The degree of background that is likelihood of whether either an object image configuration part 304 or a background image configuration part 303 is calculated for each of a plurality of image configuration parts that configures the one image object region 302. Then, the other image object region 503 having an image similar to the one image object region 302 is extracted from the other image 501 using the degree of background, and a parallax between the one image object region 302 and the other image object region 503 is calculated.

8 Claims, 7 Drawing Sheets

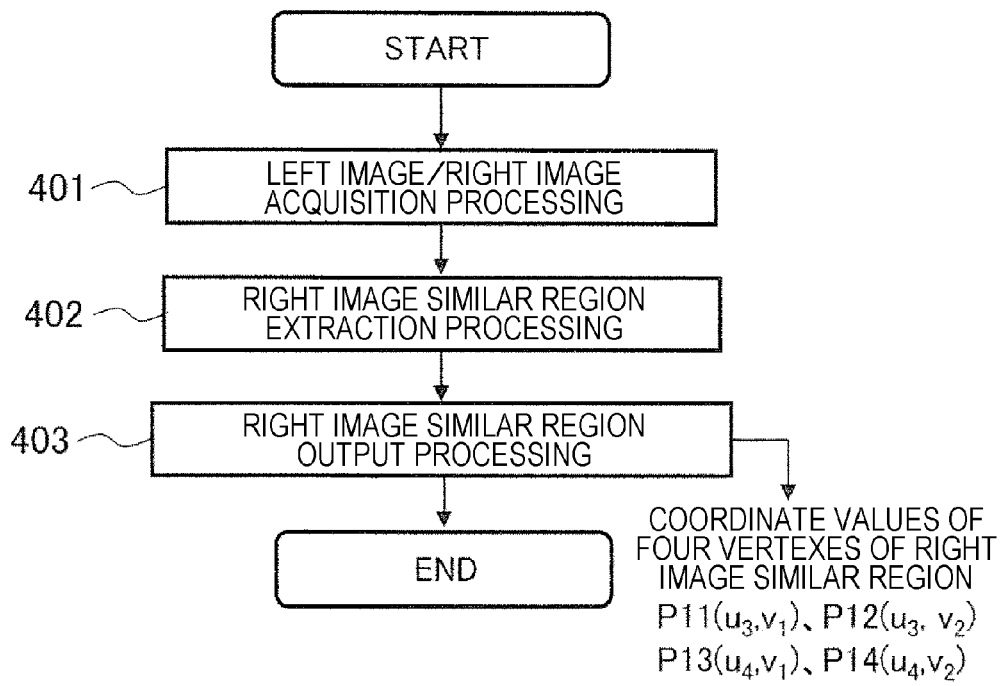
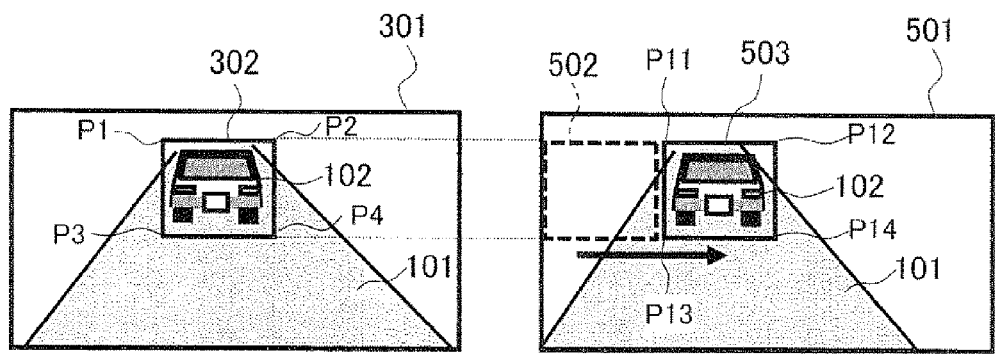

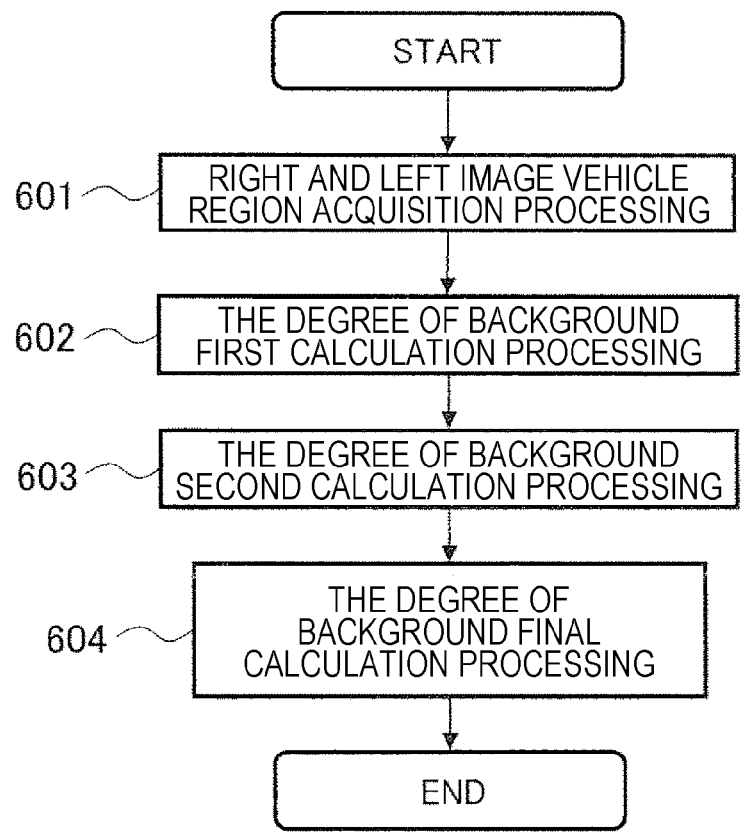
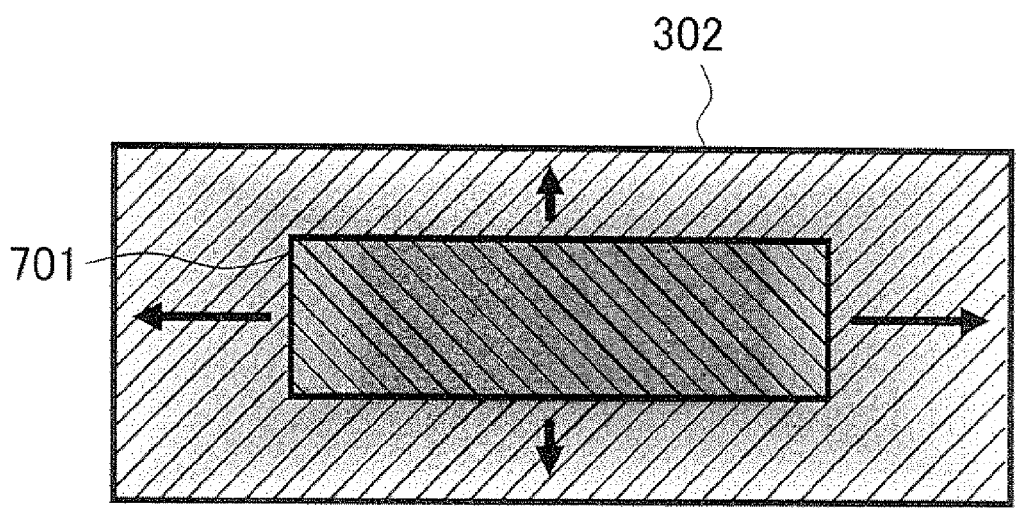

RELATIVE DISTANCE D FROM STEREO
CAMERA DEVICE 104 TO POINT 1001
$D = f * d / (d_2 + d_3) = f * d / \{(d_4 + d_5) * a\}$

IMAGE PROCESSING DEVICE AND METHOD OF PROCESSING IMAGE

TECHNICAL FIELD

The present invention relates to an image processing device and a method of processing images imaged by a plurality of imaging elements.

BACKGROUND ART

In recent years, an obstacle detection device that detects an obstacle, such as a pedestrian and an obstacle, using a plurality of cameras, such as a stereo camera device, has been put to practical use. The stereo camera device is an image processing device that calculates a position deviation (parallax) of the same object on a plurality of images imaged at the same time, calculates a position of the object on a real space based on the parallax using a known conversion formula, and recognizes the object. The stereo camera device can be applied to a monitoring system that detects intrusion of a suspicious person or abnormality, or an onboard system that assists safety driving of vehicles (see PTL 1).

CITATION LIST

Patent Literature

PTL 1: JP 2008-114627 A

SUMMARY OF INVENTION

Technical Problem

The size of an obstacle on a captured image becomes smaller as the distance between the camera and the object becomes longer, and the image becomes coarser. Therefore, the stereo camera device has a problem that it becomes difficult to distinguish between the object and its peripheral background as the distance between the stereo camera device and the object becomes longer, and an error of the parallax is increased.

The present invention has been made in view of the foregoing, and an objective is to provide an image processing device and a method of processing an image that can improve distance accuracy and can measure an accurate distance of an object in a greater distance than before when measuring a distance to the object.

Solution to Problem

In an image processing device and a method of processing an image that solve the above problem, one image object region including an image of an object is extracted from one image of a pair of images imaged by a pair of imaging elements at the same time in the same direction. Then, the degree of background that is likelihood of whether either an object image configuration part or a background image configuration part is calculated with respect to a plurality of image configuration parts that configure the one image object region. Then, the other image object region having an image similar to the one image object region is extracted from the other region, and a parallax between the one image object region and the other image object region is calculated.

Advantageous Effects of Invention

According to the present invention, when the other image object region similar to one image object region is extracted from the other image, a weight is applied according to the degree of background, and thus an effect of the background can be further decreased. Therefore, accurate parallax information of the object can be obtained, and the distance accuracy to the object can be improved. Therefore, an accurate distance to an object at a greater distance than before can be measured. Note that the above problem, configurations, and effects will become clear by the following description of embodiments.

BRIEF DESCRIPTION OF DRAWINGS

FIG. 4 is a flowchart describing content of processing by a right image similar region extraction unit.

FIG. 5 is a diagram describing content of right image similar region extraction processing.

FIG. 6 is a flowchart describing content of processing by the degree of background calculation unit.

FIG. 7 is a diagram describing content of the degree of background calculation processing according to vehicle knowledge.

DESCRIPTION OF EMBODIMENTS

Next, embodiments will be described with reference to the drawings.

In the present embodiment, a case of applying the present invention to a system that detects a preceding vehicle using a video of a stereo camera device mounted on an own vehicle will be described.

Figure 1:
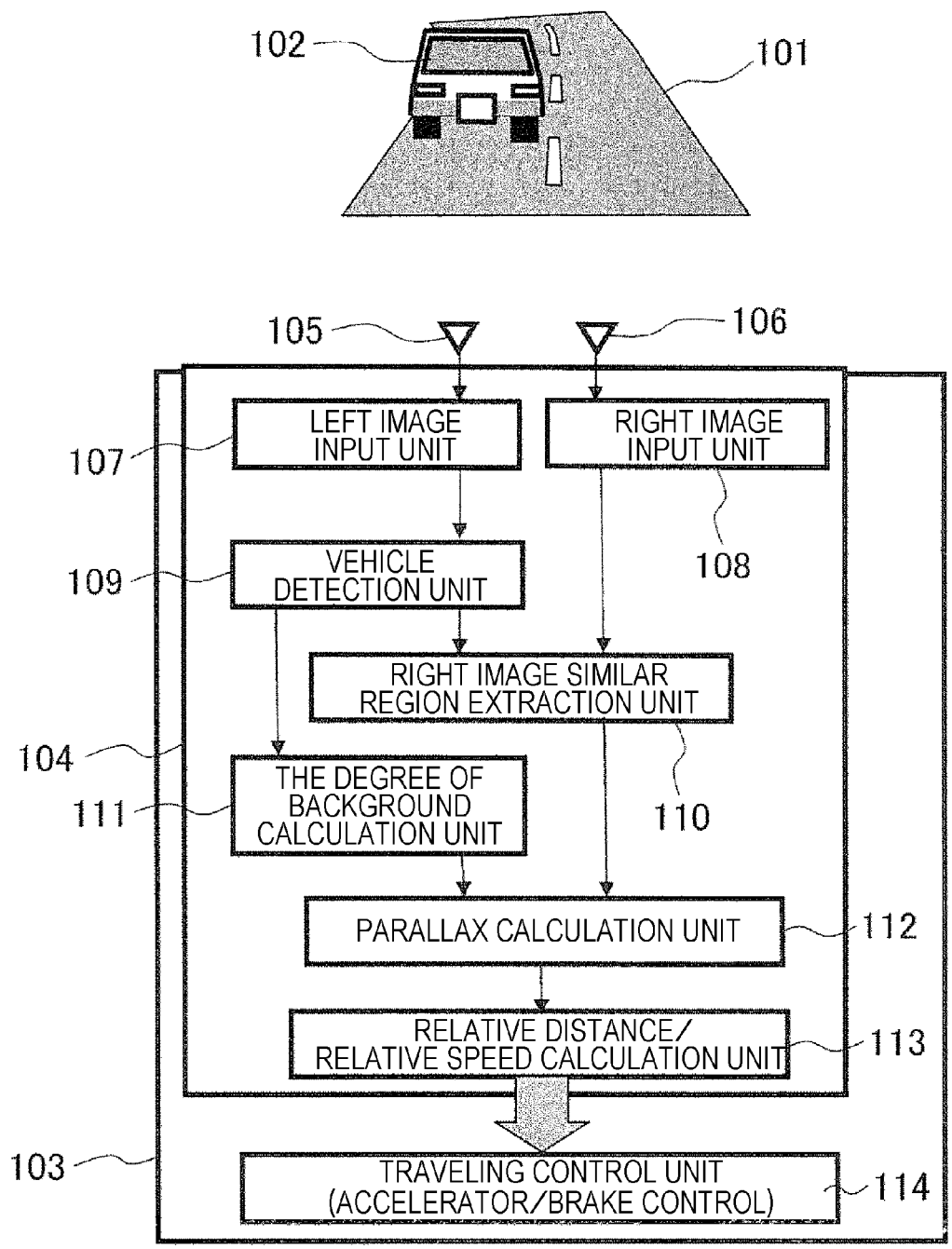
FIG. 1 is a system schematic diagram in the present embodiment.

First, an outline of the present system will be described with reference to FIG. 1. In FIG. 1, a stereo camera device 104 is mounted on a vehicle 103. The stereo camera device 104 detects existence of a preceding vehicle 102 that drives in front of the vehicle (own vehicle) 103 by image processing, and calculates a relative distance and a relative speed from the vehicle 103 to the preceding vehicle 102.

The stereo camera device 104 includes a left imaging unit (left camera) 105 and a right imaging unit (right camera) 106 as a pair of imaging means that images an area in front of the vehicle 103. A video from the left imaging unit 105 is input to a left image input unit 107, and a video from the right imaging unit 106 is input to a right image input unit 108. The left imaging unit 105 and the right imaging unit 106 respectively include imaging elements such as CCDs, and are installed in the vehicle 103 so as to image an area in front of the vehicle from positions mutually separated in a vehicle width direction.

A vehicle detection unit 109 searches an left image 301 (see FIG. 3) input to the left image input unit 107, and extracts an image region in which the preceding vehicle 102 is imaged as a left image vehicle region (one image object region) 302 (one image object region extraction means). A right image similar region extraction unit 110 searches a right image 501

(see FIG. 5) input to the right image input unit 108, and extracts an image region similar to the left image vehicle region 302 extracted in the vehicle detection unit 109 as a right image similar region (the other image similar region) 503 (see FIG. 5) (the other image similar region extraction means).

Figure 3:
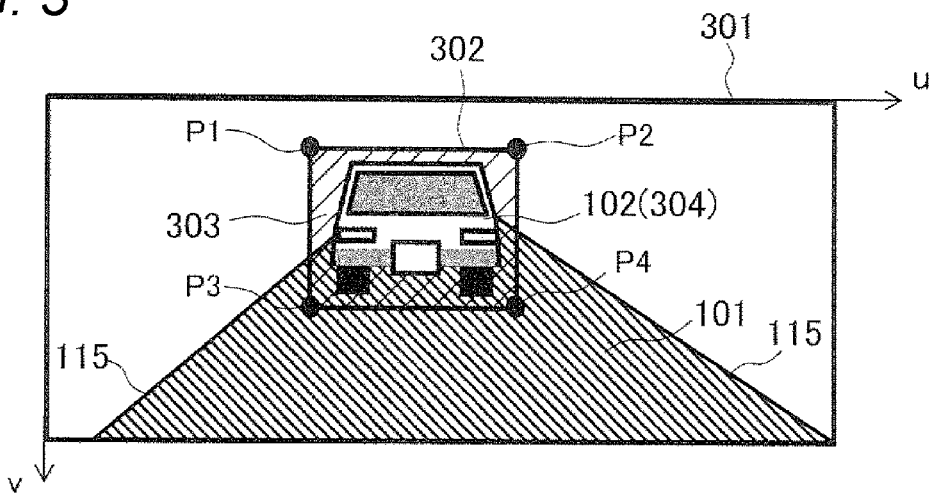
FIG. 3 is a diagram describing content of an output of vehicle region output processing.

The degree of background calculation unit 111 calculates the degree of background that is likelihood of whether either a vehicle image configuration part 304 that configures an image of the preceding vehicle 102 or a background image configuration part 303 that configures an image of the background other than the preceding vehicle 102, for each pixel, as a plurality of image configuration parts that configures the left image vehicle region 302 as illustrated in FIG. 3. Note that a range to calculate the degree of background is not limited to the pixel unit. For example, the degree of background may be calculated using a plurality of pixels as one range.

A parallax calculation unit 112 searches a peripheral range of the right image similar region 503 in the right image 501, and extracts an image region most similar to the left image vehicle region 302 as a right image vehicle region, as illustrated in FIG. 5. The parallax calculation unit 112 performs weighting using the degree of background and performs searching. Then, the parallax calculation unit 112 calculates a parallax between the extracted right image vehicle region and left image vehicle region 302.

A relative distance/relative speed calculation unit 113 calculates a relative distance and a relative speed between the preceding vehicle 102 and the vehicle 103 from the parallax of the preceding vehicle 102 calculated in the parallax calculation unit 112. The vehicle 103 controls an accelerator and a brake based on values of the relative distance/relative speed with the preceding vehicle 102 calculated in the relative distance/relative speed calculation unit 113, and performs traveling control such as control of following the preceding vehicle 102 and control to prevent collision to the preceding vehicle 102.

Figure 2:
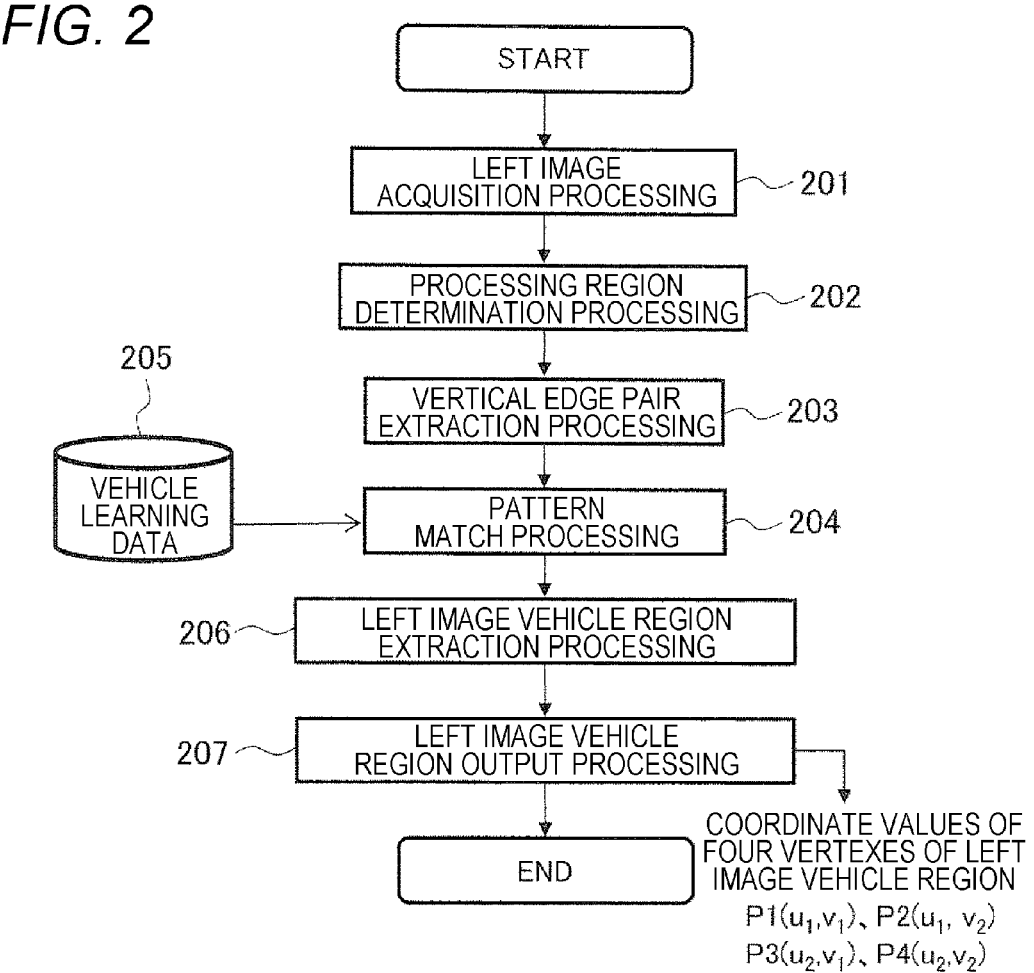
FIG. 2 is a flowchart describing content of processing in a vehicle detection unit.

Next, processing performed in the vehicle detection unit 109 will be described with reference to FIGS. 2 and 3. FIG. 2 is a flowchart describing content of the processing performed in the vehicle detection unit 109, and FIG. 3 is a diagram describing content of an output of the left image vehicle region output processing 207.

First, in left image acquisition processing 201, acquisition of the left image 301 imaged at the same time as the right imaging unit 106 in the left imaging unit 105 is performed. The left image 301 is input from the left imaging unit 105 to the left image input unit 107 of the stereo camera device 104. Then, in processing region determination processing 202, processing of determining a processing region for performing processing of extracting a portion in which the preceding vehicle 102 is imaged from the left image 301 is performed.

An example of a method of determining the processing region includes a method in which two lane boundaries 115 that are the both sides of a lane (traveling lane) of a road 101, where the vehicle 103 travels, is detected from the left image 301 imaged by the left imaging unit 105, and a region sandwiched by the detected two lane boundaries 115 is determined as the processing region.

Next, in vertical edge pair extraction processing 203, processing of extracting a pair of vertical edges, which is a pair of edge components of image luminance existing in the vertical (v) direction of the image 301, is performed in the processing region, which has been determined in the processing region determination processing 202. To extract the vertical edges, the image 301 is searched in the horizontal (u) direction, and in the image 301, a portion where portions having a fixed threshold or more incline of luminance continuously exist in the vertical direction of the image 301 is detected.

Next, in pattern matching processing 204, similarity of luminance pattern between a rectangular surrounded by the two vertical edges extracted in the vertical edge pair extraction processing 204 and vehicle learning data 205 is calculated, and whether the rectangular region surrounded by the pair of the vertical edges is a portion obtained by imaging the preceding vehicle 102 from the rear is determined. For the determination of the similarity, a technique such as neutral network or a support vector machine is used. Further, as the vehicle learning data 205, a large number of positive data images that are images of various vehicles imaged from the rear and a large number of negative data images that are captured images of non-vehicle subjects are prepared in advance.

Next, in vehicle region extraction processing 206, the image region determined in the pattern matching processing 204 as an image obtained by imaging the preceding vehicle 102 from the rear is extracted as a left image vehicle region 302. In vehicle region output processing 207, coordinate values of four vertexes P1 to P4 of the rectangular of the left image vehicle region 302: P1 $(u_1, v_1)$, P2 $(u_2, v_2)$, P3 $(u_2, v_1)$, and P4 $(u_2, v_2)$ are output.

The left image vehicle region 302 extracted here includes, as illustrated in FIG. 3, both of an object image configuration part (the image configuration part surrounded by an outline of the preceding vehicle 102 in FIG. 3) 304 that is an imaged preceding vehicle 102, and a background image configuration part (the hatched part surrounded by the outline of the preceding vehicle 102 and the outer frame of the image region 302 in FIG. 3) 303 that is not the preceding vehicle 102, in the rectangular image region.

Next, content of processing by the right image similar region extraction unit 110 of the stereo camera device 104 will be described in detail with reference to FIGS. 4 and 5. FIG. 4 is a flowchart describing content of processing performed in the right image similar region extraction unit 110, and FIG. 5 is a diagram describing content of the right image similar region extraction processing.

First, in left image/right image acquisition processing 401, the left image vehicle region 302 extracted from the left image 301 in the vehicle detection unit 109, and the right image 501 imaged at the same time as the left image 301 in the right imaging unit 106 are acquired. Then, in right image similar region extraction processing 402, an image region in which the preceding vehicle 102 that is the same as the preceding vehicle 102 imaged in the left image vehicle region 302 is imaged in the right image 501 is extracted from the right image 501 as the right image similar region 503, which is similar to the left image vehicle region 302.

FIG. 5 illustrates a method of extracting the right image similar region 503, which is similar to the left image vehicle region 302, from the right image 501. Here, the left imaging unit 105 and the right imaging unit 106 of the stereo camera device 104 are parallelized by calibration at the time of shipment. Parallelizing means that the optical axes of the right and left imaging units 105 and 106 are parallel.

Here, processing of searching the right image 501 using the rectangular search region 502 having the same size as the left image vehicle region 302, and extracting the search region 502 most similar to the left image vehicle region 302 as the right image similar region 503.

Specifically, when the coordinate values of the four vertexes of the rectangular of the left image vehicle region 302 are P1$(u_1,v_1)$, P2$(u_1,v_2)$, P3$(u_2,v_1)$, and P4$(u_2,v_2)$, the search region 502 having $(0,v_1)$, $(0,v_2)$, $(u_2-u_1,v_1)$, and $(u_2-u_1,v_2)$ in the right image 501 as four vertexes is horizontally moved in the right image 501 by one pixel at a time or by a plurality of pixels at a time, and the searching is performed. Then, when searching, a difference value between the luminance value of each pixel in the left image vehicle region 302 and the luminance value of each pixel in the search region 502 is calculated. That is, the difference value of the luminance in the same pixel position of the left image vehicle region 302 and the search region 502 is calculated for each pixel.

Then, a search region 502 at a position where a total sum value within a region that is a total sum of the difference values becomes smallest is extracted as the right image similar region 503 that is similar to the left image vehicle region 302. Here, the left imaging unit 105 and the right imaging unit 106 of the stereo camera device 104 have the same sensitivity characteristic by the calibration at the time of shipment.

Next, in right image similar region output processing 403, coordinate values $P11(u_3,v_1)$, $P12(u_3,v_2)$, $P13(u_4,v_1)$, and $P14(u_4,v_2)$ of four vertexes P11 to P14 of the rectangular of the right image similar region 503 extracted in the right image similar region extraction processing 402 are output.

Next, processing performed in the degree of background calculation unit 111 of the stereo camera device 104 will be described with reference to FIG. 6. FIG. 6 is a processing flow performed in the degree of background calculation unit 111.

First, in right and left image vehicle region acquisition processing 601, the left image vehicle region 302 output from the vehicle detection unit 109, and the right image similar region 503 output from the right image similar region extraction unit 110 are acquired. Next, processing of calculating the degree of background that is likelihood of whether each pixel of the left image vehicle region 302 is either the object image configuration part or the background image configuration part is performed. The degree of background is calculated such that the first degree of background is calculated in the degree of background first calculation processing 602, the second degree of background is calculated in the degree of background second calculation processing 603, and the final degree of background, which is integration of the first and second degrees of background is calculated in the degree of background final calculation processing 604.

First, in degree of background first calculation processing 602, processing of calculating the degree of background according to the vehicle knowledge is performed. Here, the degree of background is calculated using the vehicle knowledge that defines the likelihood of whether each pixel of the left image vehicle region 302 is either the object image configuration part or the background image configuration part. The degree of background is a value expressing the likelihood of a certain pixel becoming the background. For example, when the degree of background is 1, the pixel can be determined as the background image configuration part, and when the degree of background is 0, the pixel can be determined as the object image configuration part. Then, when the degree of background takes a middle position between 0 and 1, the pixel has likelihood proportional to the value. FIG. 7 illustrates a calculation example of the degree of background using the vehicle knowledge. Here, the degree of background of each pixel is calculated by linearly complementing the degree of background using the vehicle knowledge that a center region 701 illustrated by a rectangular is a vehicle region (the degree of background is 0), and an outer frame end of the left image vehicle region 302 is the background (the degree of background is 1).

Figure 8:
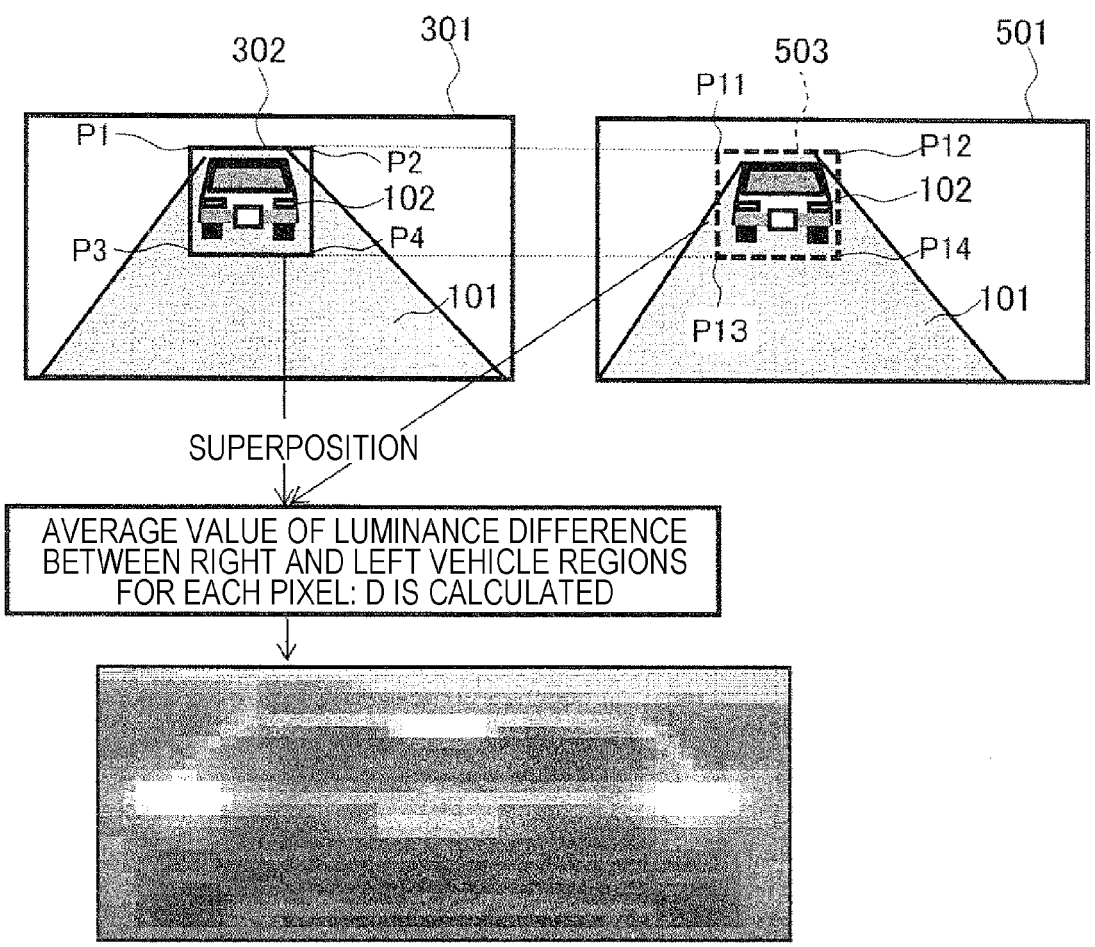
FIG. 8 is a diagram describing content of the degree of background calculation processing according to an superposition error.

Next, in the degree of background second calculation processing 603, processing of calculating the degree of background according to a superposition error. Here, the degree of background of each pixel is calculated according to magnitude of an error of the luminance value of when the left image vehicle region 302 and the right image similar region 503 are superposed. FIG. 8 illustrates a method of calculating the degree of background of each pixel according to a superposition error.

First, the left image vehicle region 302 and the right image similar region 503 are superposed such that coordinate starting points coincide with each other. Then, a difference value of the luminance in the same pixel position of the left image vehicle region 302 and the right image similar region 503, and an average D and a standard deviation $\sigma$ of the differences within the region are calculated. Then, the degree of background is calculated for each pixel where the degree of background is 0 when the difference value is smaller than $D\pm1\sigma$, the degree of background is 0.5 when the difference value is between $D\pm1\sigma$ and $D\pm3\sigma$ (inclusive), and the degree of background is 1.0 when the difference value is larger than $D\pm3\sigma$.

Next, in the degree of background final calculation processing 604, multiplication of the degree of background output in the degree of background first calculation processing 602 and the degree of background output in the degree of background second calculation processing 603 is performed for each pixel, and the final degree of background is calculated for each pixel.

Note that, in the above, a case of calculating the final degree of background using the first and second degrees of background has been described. However, the embodiment is not limited to the example. A method may be employed as long as the method uses at least one of the first and second degrees of background. Further, the method of calculating the degree of background is an example, and the degree of background may be calculated by other methods.

Figure 9:
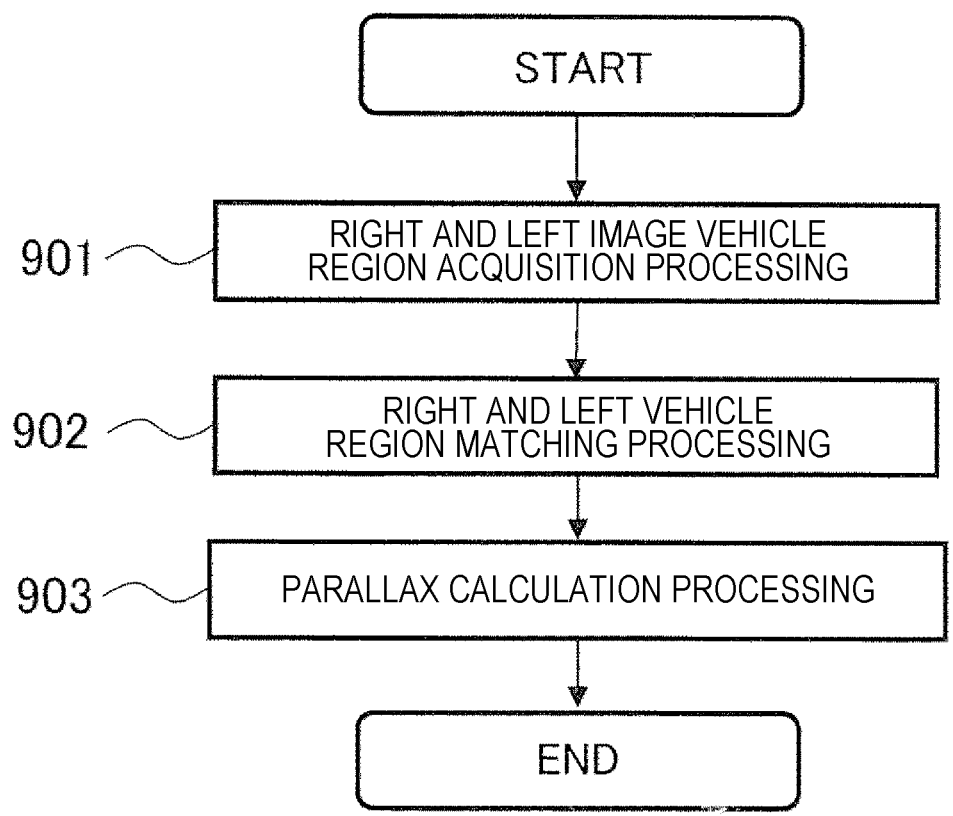
FIG. 9 is a flowchart describing content of processing by a parallax calculation unit.

Next, processing of the parallax calculation unit 112 with reference to FIG. 9. FIG. 9 is a flowchart describing content of the processing performed in the parallax calculation unit 112.

First, in right and left image vehicle region acquisition processing 901, processing of acquiring the left image vehicle region 302 output from the vehicle detection unit 109, and the right image similar region 503 output from the right image similar region extraction unit 110 is performed.

Next, in right and left vehicle region matching processing 902, processing of extracting a right image vehicle region (the other image object region) that is most similar to the left image vehicle region 302 from the right image 501 using the degree of background is performed. Here, a peripheral region having a predetermined size around the right image similar region 503 in the right image 501 is searched.

Then, when the peripheral range is searched, a difference value between the luminance value of each pixel in the left image vehicle region 302 and the luminance value of each pixel in the search region 502 is calculated. That is, the difference value of the luminance values in the same pixel position of the left image vehicle region 302 and the search region 502 is calculated for each pixel. Accordingly, the difference value of the luminance values of pixels located in the same position when the left image vehicle region 302 is superposed on the right image 501 has been calculated for each pixel.

Then, weighting is applied to the difference value of the luminance values of each pixel using the degree of background of each pixel obtained by the degree of background final calculation processing 604. Here, a value (=(1−the degree of background)×difference value) is calculated for each pixel. This value is obtained such that a difference value is multiplied to a value that is obtained by subtracting the degree of background from 1 (1−the degree of background).

Then, the total sum value in the search region 502 is calculated. Then, in the searched peripheral range, a search region 502 where the total sum value becomes smallest is extracted as the right image vehicle region.

Next, in parallax calculation processing 903, a parallax that can be obtained as a result of the right and left vehicle region matching processing 902 using the degree of background is output. Here, $u_1-u'_1$ expresses the parallax where an upper left coordinate of the left image vehicle region 302 is $(u_1,v_1)$, and an upper left coordinate of the right image vehicle region matched in the right image is $(u'_1,v_1)$, and a value of the parallax is output.

In the parallax calculation unit 112, when the right image vehicle region that is similar to the left image vehicle region 302 is extracted, the weighting is performed according to the degree of background. Therefore, an effect of the background can be further reduced. Therefore, an accurate parallax of the preceding vehicle 102 can be calculated.

Further, in the parallax calculation unit 112, the peripheral range around the right image similar region 503 in the right image 501 is searched, and the search range is narrowed down. Therefore, the search time can be made shorter than the case where the right image 501 is widely searched. Especially, in the processing of extracting the right image vehicle region, the calculation processing of performing the weighting according to the degree of background is performed. Therefore, by narrowing down of the search range, the load of the calculation processing is reduced, and the processing speed can be improved.

Next, a method of calculating a relative distance by the relative distance/relative speed calculation unit 113 will be described with reference to FIG. 10. First, in FIG. 10, a method of calculating a distance from a camera to a corresponding point 1001 of the left image 301 and the right image 501 (the same object of the right and left cameras) will be described.

Figure 10:
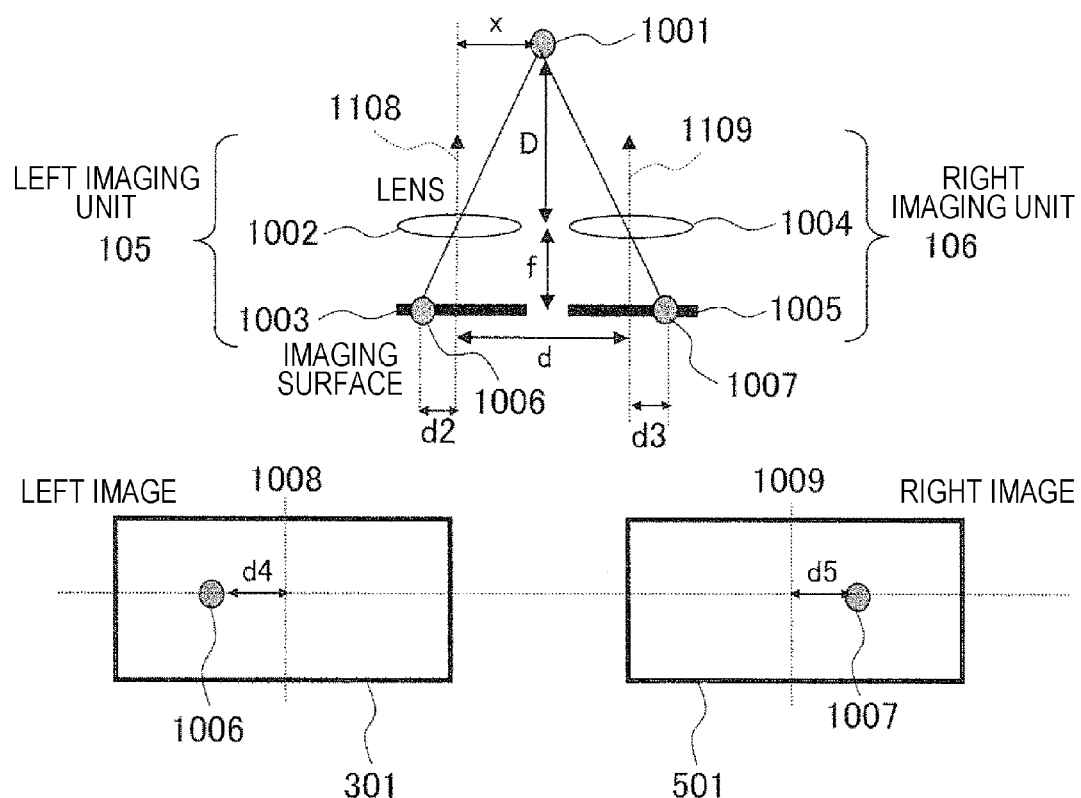
FIG. 10 is a diagram describing content of parallax calculation processing of right and left vehicle regions.

In FIG. 10, a left imaging unit 105 is a camera having a focal distance f made of a lens 1002 and an imaging surface 1003, and an optical axis 1008. A right imaging unit 106 is a camera having a focal distance f made of a lens 1004 and an imaging surface 1005, and an optical axis 1009. A point 1001 in front of the cameras is imaged to a point 1006 of the imaging surface 1003 of the left imaging unit 105 (a distance $d_2$ from the optical axis 1008), and is positioned in the point 1006 (a position of $d_4$ pixels from the optical axis 1108) in the left image 301. Similarly, the point 1001 in front of the cameras is imaged to a point 1007 of the imaging surface 1005 of the right imaging unit 106 (a distance $d_3$ from the optical axis 1009), and is positioned in the point 1007 (a position of $d_5$ pixels from the optical axis 1009) in the right image 501.

As described above, the point 1001 of the same object is imaged to the position left from the optical axis 1008 by $d_4$ pixels in the left image 301, and to the position right from the optical axis 1009 by $d_5$ pixels in the right image 501, and a parallax of $(d_4+d_5)$ pixels occurs. Therefore, a distance D from the stereo camera device 104 to the point 1001 can be obtained by the following expression:

$$d_2:f=x:D$$

from the relationship between the point 1001 and the left imaging unit 105; and $$d_3:f=(d-x):D$$

from the relationship between the point 1001 and the right imaging unit 106, where a distance between the optical axis 1008 of the left imaging unit 105 and the point 1001 is x.

Therefore, $D=f\times d/(d_2+d_3)=f\times d/\{(d_4+d_5)\times a\}$. Here, a is the size of the imaging elements of the imaging surface 1003 and 1005.

The above-described stereo camera device 104, as an image processing device, recognizes the preceding vehicle 102 that is an object, the parallax information of which is obtained from the left image 301, extracts the left image vehicle region 302 including an image of the preceding vehicle 102 in the left image 301, calculates the degree of background for each pixel that configures the left image object region, extracts the right image vehicle region that is similar to the left image vehicle region 302 from the right image 501 using the degree of background, and calculates the parallax between the left image vehicle region and the right image vehicle region.

According to the stereo camera device 104, when the right image vehicle region that is similar to the left image vehicle region 302 is extracted, weighting is performed according to the degree of background. Therefore, an effect of the background can be further reduced. Therefore, accurate parallax information of the preceding vehicle 102 can be obtained, and the distance accuracy to the preceding vehicle 102 can be improved. Therefore, an accurate distance of a preceding vehicle 102 at a greater distance than before can be measured.

Further, the stereo camera device 104 extracts the right image similar region 503 from the right image 501 using the left image vehicle region 302 in advance, and when extracting the right image vehicle region from the right image 501 using the degree of background, the stereo camera device 104 may search a peripheral range of the right image similar region 503 and extract the right image vehicle region. Accordingly, compared with a case of widely searching the right image 501, the search time can be made shorter. Especially, in the processing of extracting the right image vehicle region, the calculation processing of performing weighting according to the degree of background is performed. Therefore, the load of the calculation processing can be reduced, and the processing speed can be improved.

Note that the present invention is not limited to the content of the above-described embodiments, and various modifications are possible without departing from the gist of the present invention. For example, while, in the above-described embodiments, the right image similar region extraction unit 110 extracts the right image similar region 503, and the parallax calculation unit 112 searches the peripheral range of the right image similar region 503, and extracts the right image vehicle region, the embodiment is not limited to the example. For example, similarly to the right image similar region extraction processing 402, a configuration of horizontally moving the search region 502 having $(0,v_1)$, $(0, v_2)$, $(u_2-u_1, v_1)$, and $(u_2-u_1,v_2)$ as the four vertexes in the right image, and searching the right image vehicle region that is similar to the left image vehicle region 302 may be employed.

Note that, while the embodiments of the present invention have been described in detail, the present invention is not limited to the embodiments, and various design changes can be performed without departing from the spirit of the present invention described in the claims. For example, the above embodiments have been described in detail for easily describing the present invention, and are not necessarily limited to one having all configurations described above. Further, a part of a configuration of one embodiment can be replaced with a configuration of another embodiment, and a configuration of one embodiment can be added to a configuration of another embodiment. Further, addition/deletion/replacement of another configuration can be performed with respect to a part of a configuration of each embodiment.

REFERENCE SIGNS LIST 102 preceding vehicle (object)
103 vehicle (own vehicle)
104 stereo camera device (image processing device)
105 left imaging unit (left camera)
106 right imaging unit (right camera)
107 left image input unit
108 right image input unit
109 vehicle detection unit
110 right image similar region extraction unit
111 the degree of background calculation unit
112 parallax calculation unit
113 relative distance/relative speed calculation unit
302 left image vehicle region (one image object region)
502 search region
503 right image similar region

The invention claimed is:

1. An image processing device that processes a pair of images imaged by a pair of imaging elements at the same time in the same direction, the device comprising:
one image object region extraction means configured to recognize an object, parallax information of which is to be acquired from one image, and to extract one image object region that is an imaged region including an image of the object in the one image;
the degree of background calculation means configured to calculate the degree of background that is likelihood of whether either an object image configuration part that configures an image of the object, or a background image configuration part that configures an image of a background other than the object with respect to a plurality of image configuration parts that configures the one image object region; and
a parallax calculation means configured to extract the other image object region having an image similar to the one image object region from the other image, and to calculate a parallax between the one image object region and the other image object region.

2. The image processing device according to claim 1, further comprising:
the other image similar region extraction means configured to search the other image using the one image object region extracted by the one image object region extraction means, and to extract the other image similar region having an image similar to the one image vehicle region from the other image,
wherein the parallax calculation means searches a peripheral region having a predetermined size around the other image similar region in the other image.

3. The image processing device according to claim 1, wherein the degree of background calculation means include at least one of the degree of background first calculation means configured to calculate the degree of background based on predetermined vehicle knowledge, and the degree of background second calculation means configured to calculate the degree of background based on a luminance difference between mutually corresponding image configuration parts when the one image object region and the other image object region are superposed.

4. The image processing device according to claim 1, wherein the parallax calculation unit calculates a difference value of luminance values of image configuration parts mutually located at the same position when the one image object region is superposed on the other image for each image configuration part, performs weighting using the degree of background with respect to each difference value, and extracts the other image object region using each of the weighted difference values.

5. A method of processing a pair of images imaged by a pair of imaging elements at the same time in the same direction, the method comprising:
a step of recognizing an object, parallax information of which is to be acquired from one image, and extracting one image object region that is an imaged region including an image of the object in the one image;
a step of calculating the degree of background that is likelihood of whether either an object image configuration part that configures an image of the object, or a background image configuration part that configures an image of a background other than the object with respect to a plurality of image configuration parts that configures the one image object region; and
a step of extracting the other image object region having an image similar to the one image object region from the other image, and calculating a parallax between the one image object region and the other image object region.

6. The image processing device according to claim 2 wherein the degree of background calculation means include at least one of the degree of background first calculation means configured to calculate the degree of background based on predetermined vehicle knowledge, and the degree of background second calculation means configured to calculate the degree of background based on a luminance difference between mutually corresponding image configuration parts when the one image object region and the other image object region are superposed.

7. The image processing device according to claim 2, wherein the parallax calculation unit calculates a difference value of luminance values of image configuration parts mutually located at the same position when the one image object region is superposed on the other image for each image configuration part, performs weighting using the degree of background with respect to each difference value, and extracts the other image object region using each of the weighted difference values.

8. The image processing device according to claim 3, wherein the parallax calculation unit calculates a difference value of luminance values of image configuration parts mutually located at the same position when the one image object region is superposed on the other image for each image configuration part, performs weighting using the degree of background with respect to each difference value, and extracts the other image object region using each of the weighted difference values.

* * * * *